April 5, 1966  W. H. PERRY  3,243,904
BRUSH CLEARING ATTACHMENT
Filed Aug. 7, 1964  2 Sheets-Sheet 1
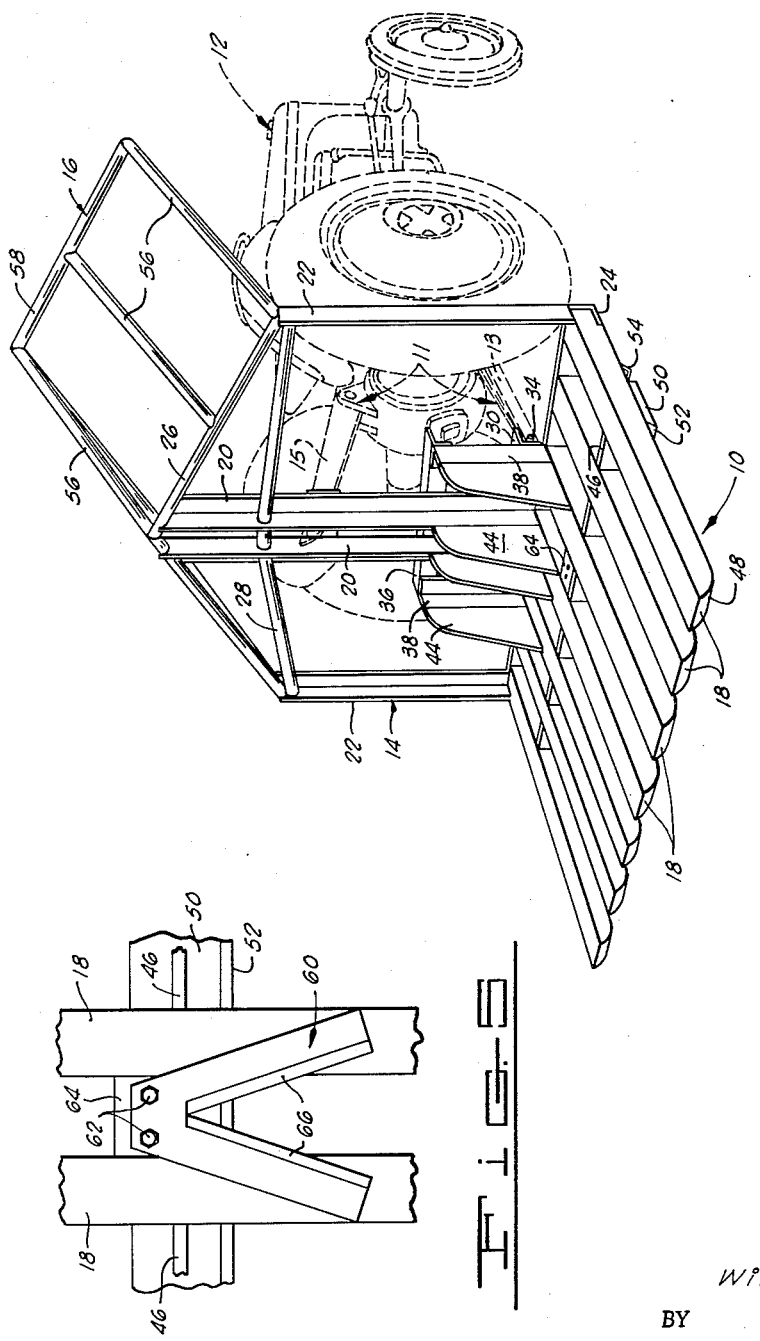
INVENTOR.
WILLIAM H. PERRY
BY
Dunlap & Laney
ATTORNEY April 5, 1966 W. H. PERRY 3,243,904
BRUSH CLEARING ATTACHMENT
Filed Aug. 7, 1964 2 Sheets-Sheet 2
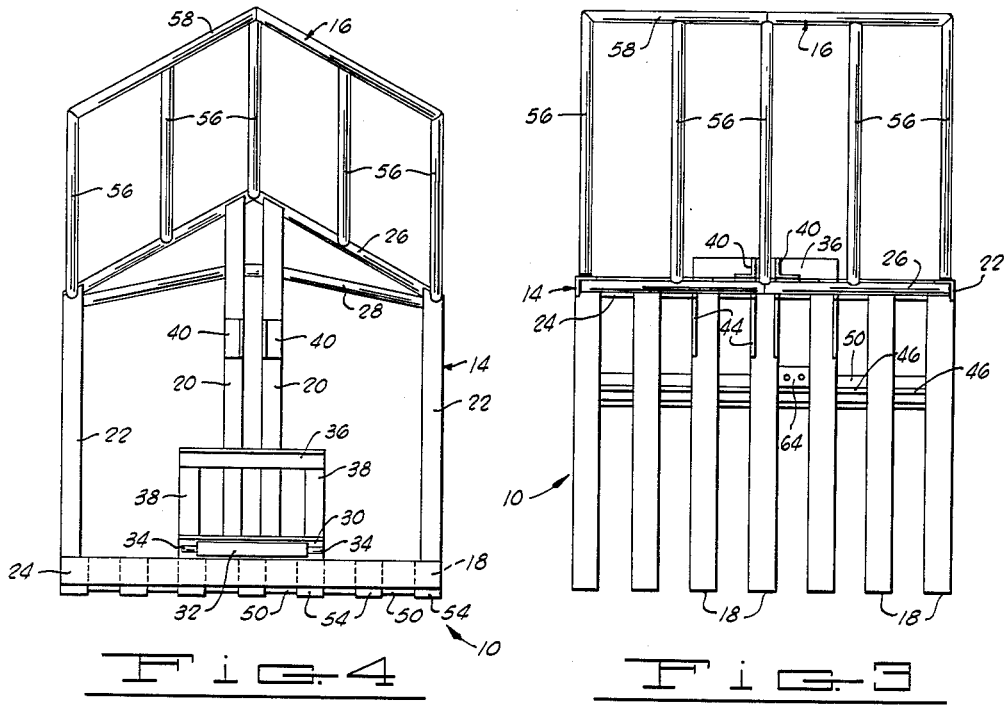
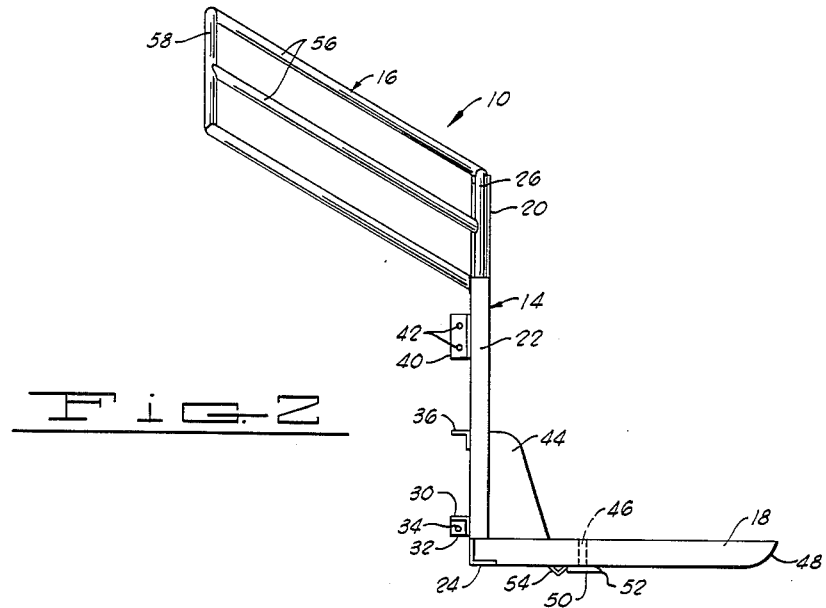
INVENTOR.
WILLIAM H. PERRY
BY
Dunlap & Laney
ATTORNEYS

United States Patent Office 3,243,904
Patented Apr. 5, 1966

3,243,904
BRUSH CLEARING ATTACHMENT
William H. Perry, Rte. 1, Box 411,
Oklahoma City, Okla.
Filed Aug. 7, 1964, Ser. No. 388,066
6 Claims. (Cl. 37—2)

This invention relates generally to improved brush clearing equipment. More particularly, but not by way of limitation, this invention relates to an improved brush clearing attachment for use with tractors having a power lift, said attachment being adapted to sever, transport, and stack brush.

Various types of attachments for tractors have been constructed in the past and used for raking and transporting pre-cut brush to a remote area wherein the brush is destroyed. Also, various forms of separate brush cutting attachments for vehicles have been constructed. One form of cutting attachment manufactured in the past for use with tractors utilizes a cutting blade that moves relative to a fixed shear bar, such as is common practice in grass cutting devices. One disadvantage of moving blade cutting devices is that some means must be provided to actuate the moving blade. Also the brush which can be cut by such devices is limited to relatively small sizes by the arrangement and construction of the cutting blade and shear bar, and by the power train driving the moving blade. Moreover, the moving parts characteristic of such devices made them frequently subject to a Pandora's box of mechanical troubles relatively early in the service life of the equipment.

Fixed blade cutting devices capable of clearing large brush have been manufactured, but their use has been primarily limited to tracked vehicles, such as bulldozers, because of the power requirements. As typical of fixed blade cutting devices of the type heretofore proposed, and in some instances used, reference may be made to United States Patents Nos. 2,615,262 issued to C. K. Reid, Sr., on Oct. 28, 1962; 3,021,619 issued to C. C. McGee on Feb. 20, 1962; 3,090,138 issued to E. A. Dudley on May 21, 1963; and 3,111,777 issued to C. R. Prater on Nov. 26, 1963. Although structure of the general type shown in these patents have functioned well in cases where the requirements of the devices are restricted primarily to cutting vegetation to be later gathered and stacked manually or by other devices, such as mechanized rakes, none of the foregoing includes structure for protecting the vehicle operator or for gathering and transporting the vegetation after it has been cut.

A device, somewhat similar to the foregoing, but typifying structure for protecting the vehicle operator is illustrated by United States Patent No. 3,004,570 issued to W. R. Clayton et al. on Oct. 17, 1961. While this device included a saw-like blade, which was proposed for the purpose of sawing relatively large trees in two, it also included a structure that engaged the tree above the blade to force the tree to fall away from the vehicle. Devices of this type are effective for the intended purpose, i.e. that is cutting trees, but, like the previously discussed bladed structures, do not provide for gathering or collecting the brush after it has been cut.

Powered rakes or collecting devices are illustrated in United States Patent No. 2,791,340 issued to D. R. Haines et al. on May 7, 1957. Such devices are constructed for the purpose of collecting pre-cut brush and other loose materials and are effective for that purpose, but do not provide any means for cutting or severing the brush to be collected.

Broadly stated, this invention relates to an improved brush clearing attachment for use with vehicles having a power lift mechanism to which the brush clearing attachment can be connected. The attachment includes an upstanding frame which is connectable to the power lift, a plurality of generally horizontally extending, elongated tines attached to the lower end of the upstanding frame for guiding and collecting the brush, a cutting blade mounted on the tines for cutting and severing the brush, and a protective frame that extends from the upstanding frame over a portion of a vehicle to which the attachment is secured to protect the operator from the brush cut and collected on the attachment. In addition, the combination can optionally include a bifurcated post pulling member having divergent portions which can be removably positioned between a pair of adjacent tines whereby posts can be wedged therebetween and pulled from the ground upon actuation of the power lift to raise the attachment.

This invention provides an improved brush clearing attachment that utilizes the simplicity and effectiveness of fixed blade cutting devices while at the same time gathering and collecting the cut brush. The attachment can collect relatively large quantities of cut brush due primarily to the elongated tines and thereby avoids the time and expense involved in a separate collecting operation as previously discussed. Furthermore, an effective protective frame is provided that permits the operator to safely collect the relatively large quantities of brush on the attachment without endangering himself.

It is, therefore, one object of the invention to provide an improved brush clearing attachment for vehicles that cuts, collects, and transports brush.

Another object of the invention is to provide an improved brush clearing attachment for use with vehicles and particularly with tractor vehicles, which attachment has no moving parts.

One other object of the invention is to provide an improved brush clearing attachment that can be quickly and easily connected to and disconnected from the vehicle with which it is to be used.

Still another object of the invention is to provide an improved brush clearing attachment that requires very little maintenance.

A further object of the invention is to provide an improved brush clearing attachment that can be easily and economically manufactured.

A still further object of the invention is to provide an improved brush clearing attachment that includes means for protecting the vehicle operator from brush cut by the attachment.

An additional object of the invention is to provide an improved brush clearing attachment that can be arranged to pull posts or similar objects from the ground.

The foregoing and additional objects and advantages of the invention will become more apparent as the following detailed description of the invention is read in conjunction with the accompanying drawings wherein like reference characters denote like parts in all views and wherein:

FIG. 1 is a perspective view of a brush clearing attachment constructed in accordance with the invention attached to the power lift of a tractor;

FIG. 2 is a side elevation view of the attachment of FIG. 1;

FIG. 3 is a top plan view of the attachment of FIG. 1;

FIG. 4 is an elevation view of the attachment of FIG. 1 as it appears from the side thereof which is adjacent the vehicle to which it is to be attached; and FIG. 5 is a top fragmentary view of a portion of the brush clearing attachment having a post pulling device mounted thereon.

Referring to the drawing, and to FIG. 1 in particular, shown therein is a brush clearing attachment constructed in accordance with one embodiment of the invention and generally designated by the reference character 10. The brush clearing attachment 10 is illustrated as being connected with a conventional farm-type tractor 12 which is shown in dash lines. The tractor 12 includes a rear mounted power lift 11 having a pair of spaced lower arms or members 13 and a top arm or member 15 providing a three-point suspension for plows, harrows, etc. which may be attached thereto. As shown in FIG. 1, the brush clearing attachment 10 includes an upstanding frame 14, a protective frame 16 connected with the upstanding frame 14 and extending angularly therefrom in a direction whereby it projects over a portion of the tractor 12, and a plurality of elongated tines 18 which are connected with the lower end portion of the frame 14 and extend therefrom in a direction away from the tractor 12.

The detailed structure of the brush clearing attachment 10 can be most clearly seen in FIGS. 2, 3, and 4. As shown therein, the upstanding frame 14 includes a pair of generally parallel, vertical central members 20 and a pair of end members 22 which are disposed in parallel spaced relationship with respect to the central members 20. The lower ends of the members 20 and 22 are joined by a horizontally extending member 24. As shown most clearly in FIG. 4, the upper ends of the members 20 and 22 are secured to angularly joined top members 26. A cross member 28 extends between and is connected with the end members 22, passing through the central members 20. The cross member 28 is vertically spaced from the top member 26 to provide more rigidity in the upstanding frame 14.

The upstanding frame 14 is also provided with a shortened horizontal cross member 30 which is attached to the vertical central members 20 and is located adjacent the horizontal member 24. The member 30 is provided to support a connecting member 32 for purposes which will appear more fully hereinafter. The connecting member 32 is provided at each end with a pin like portion 34. A second short cross member 36 extends partially across the upstanding frame 14 in vertically spaced relation to the cross member 30 and is also attached to the vertical central members 20. A pair of vertical members 38 extend between the respective adjacent ends of the short cross members 30 and 36. A pair of spaced connecting brackets 40 are secured to the central members 20 above the short cross member 36. The brackets 40 are provided with one or more holes 42 extending therethrough for the purpose of providing an adjustable attachment for connecting the top arm 15 of the power lift 11 to the attachment 10.

As is shown most clearly in FIGS. 1 and 2, a plurality of gusset members 44 are connected with the central members 20 and the vertical members 38 and with the tines 18 for the purpose of making the assembly between the tines 18 and the upstanding frame 14 more rigid. The gusset members 44 also provide additional vertical support for the short cross members 30 and 36 and the vertical central members 20, thereby reducing the possibility of deformation or failure of those members due to the forces imposed thereon by connection with the power lift 11 during use of the attachment 10. Furthermore, the gusset members 44 aid in preventing the accumulation of small brush, vines, etc. which could become entangled about the connecting member 32 and interfere with connection and disconnection of the attachment 10 with the power lift 11.

The tines 18 have one end thereof connected with the horizontal member 24 of the upstanding frame 14 and extend therefrom in generally parallel relationship. The tines are retained in spaced relationship by a plurality of spacer members 46 which can be seen most clearly in FIGS. 1 and 3. As can be appreciated from viewing the several figures of the drawing, the tines 18 have a generally rectangular cross-section and have the lower portion of the free ends provided with a radius, as shown at 48, for purposes which will become more apparent as the description proceeds.

A cutting blade 50 is attached to the lower surface of the tines 18 and extends thereacross in a direction generally perpendicularly with respect to the elongation of the tines 18. The blade 50 may be attached to the tines 18 in any suitable manner, such as by countersunk screws (not shown). The blade 50 is preferably removably attached to the tines so that it can be removed for sharpening and replacement as desired or required. The edge 52 of the blade 50 is oriented in a direction toward the free ends of the tines 18 and is sharpened to provide the desired cutting action. As can be seen in FIGS. 1, 2, and 4, a plurality of blade support members 54 which have a length approximately equal to the width of a single tine 18 are attached to the lower surface of the tines 18 immediately to the rear of the blade 50 for the purpose of preventing blade 50 from moving toward the upstanding frame 14 upon engagement with brush which is to be cut. The support members 54 also prevent the blade 50 from plowing into the earth to any significant depth by acting as protective skids.

The protective frame 16 includes a plurailty of elongated members 56 which have one end thereof connected with the top member 26 of the upstanding frame 14 and extend therefrom in generally parallel, spaced relation toward the tractor, but at an angle relative to both the horizontal and vertical. The ends of the members 56 which are opposite to the ends attached to the upstanding frame 14 are connected by a member 58 which is disposed perpendicularly with respect to the members 56. The arrangement and construction of the protective frame 16 is such that it extends over a portion of the tractor 16 above the position in which an operator would sit to operate the tractor 12 and brush clearing attachment 10 to protect the operator from brush which has been cut and deposited thereon. The generally V-shaped configuration of the protective frame 16, and its rearward slope relative to the tractor, tend to deflect accumulation of brush to either side and to the rear of the tractor. Also, it is inherently configured to provide a supporting frame facilitating attachment of a sheet metal sun shield or rain-deflecting roof (not shown), which may also be made of canvas in instances where the type of task to be performed with the tractor and attachment will not result in brush or trees falling or accumulating on the protective frame.

FIG. 5 illustrates a post pulling attachment that may be removably mounted on the brush clearing attachment 10. The post pulling device, which is generally designated by the reference character 60, may be described as a bifurcated member or blade that is attached by means of cap screws 62 to a bracket 64 extending between and connected to adjacent tines 18. As illustrated in FIG. 1, the bracket 64 is positioned between the adjacent tines 18 which are generally centrally located among all of the tines 18 of the attachment 10 so that an upward force exerted on the post pulling device 60 will be exerted substantially in the center of the attachment 10. The legs of the bifurcated post pulling device 60 extend toward the free ends of the tines 18 and are divergent in the same direction so that the inner surfaces thereof form an apex located generally above the cutting edge 52 of the blade 50. It can be observed that the inner surfaces of the post pulling device 60 are sharpened as shown at 66. The sharpened edges 66 are provided so that secure grip may be obtained upon the engagement of the post pulling device 60 with a post which is to be removed. The edges 66 need not be sharpened to the point where they will actually perform a cutting operation.

When it is desired to clear an area of brush, the brush celaring attachment 10 is connected with the tractor 12 or other vehicle. The connection between the brush clearing attachment 10 and tractor 12 is accomplished by connecting the two lower members 13 of the power lift 11 on the tractor 12 with the pins 34 on the connecting member 32 and connecting the top or upper member 15 of the power lift 11 with the brackets 40 by inserting a pin (not shown) through the holes 42 in the bracket 40 and through a corresponding hole (not shown) in the top member 15. The power lift 11 is actuated to raise the brush clearing attachment 10 free of the ground. Upon reaching the area wherein the brush is to be removed, the power lift 11 is operated to lower the brush clearing attachment 10 until the lower surfaces of the tines 18 come in contact with the surface of the ground. The tractor 12 is then backed through the area so that the brush is engaged by the tines 18 and directed and guided therebetween into engagement with the cutting surface of the blade 50. The radius 48 on the free ends of the tines 18 prevent the tines from "digging in" the surface of the ground, and thereby promote the smooth movement of the attachment 10 along the surface of the ground. It can be appreciated that the blade 50, being positioned below the lower surface of the tines 18, will cause engagement between the brush and the blade to be made at the surface of the ground or slightly below. The advantage gained by cutting the brush at the surface is that there will be no stubble remaining which must be susequently removed in another operation. Due to the length of the tines 18, the brush which has been cut will be retained thereon. As the severed brush piles up on the attachment 10, it can be seen that the protective frame 16 will prevent any of the severed brush from striking the tractor operator. When the attachment 10 is filled with brush, the power lift 11 may be actuated to lift the attachment 10 above the surface of the ground. The tractor is then driven to an area wherein the brush is to be piled for destruction. The provision of the plurality of tines 18 provides the additional advantage of limiting the size of brush which can engage the blade 50. Preferably, the tines 18 are spaced so that any brush which will enter therebetween can be severed by the power available from the tractor 12. The foregoing operations are continued and repeated until the area is cleared of brush.

If it should be desired to remove a post, such as might be present as a result of a fence which extends through the area to be cleared, the post pulling device 60 is mounted on the attachment 10 as previously described. The tractor 12 and attachment 10 would then be backed into a position wherein the post (not shown) will pass between the tines 18 which are located on either side of the post pulling device 60. As the tractor 12 is backed toward the post the sharpened edges 66 of the post pulling device will move into gripping engagement with the post. As soon as the post has been securely engaged by the post pulling device 60, the tractor 12 is stopped and the power lift 11 actuated to raise the attachment 10 and the post pulling device 60 mounted thereon. Raising the post pulling device 60 which is securely engaged with the post will exert an upward force thereon which will pull the post from the ground. In some instances, it may also be desirable to move small trees in this fashion.

It should be apparent from the foregoing detailed description that a brush clearing attachment constructed in accordance with the invention may be easily and economically manufactured and that very little maintenance will be required to maintain the attachment in operating condition. Furthermore, it should be apparent that the attachment described hereinbefore provides a very effective means of severing, transporting, and stacking brush. Also, it can be quickly and easily connected and disconnected to a common farm tractor which is equipped with a rear mounted power lift.

It should be understood that the foregoing embodiment described in detail herein is presented by way of example only and that many modifications and changes can be made thereto without departing from the scope of the invention or the spirit of the annexed claims. For example, the brush clearing attachment of the invention has been described as being adaptable for connection to a tractor or other self-powered vehicle through a three-point hitch connection; a connection of this type, however, is merely exemplary, and other types of connection means can be provided on said framework for connection to self-powered vehicles other than those having the three-point hitch connection herein described.

What is claimed is:

1. A brush clearing attachment for use with tractors having a power lift comprising:
   an upstanding frame;
   connection means on said frame for connecting said attachment to the power lift on the tractor;
   a protective frame connected with said upstanding frame and projecting from said upstanding frame over a portion of the tractor; and,
   a plurality of generally horizontally extending elongated tines each having a forward end and also having a rearward end thereof secured to said upstanding frame and extending from the opposite side of said upstanding frame from said protective frame; and,
   a shaped blade member rigidly fixed to and extending across said tines and positioned closer to the rearward ends of the said tines than to the forward ends thereof.

2. A brush clearing attachment for use with a tractor having a power lift comprising:
   an upstanding frame having an upper end and a lower end;
   connection means on said frame for connecting said attachment to the power lift on the tractor;
   a protective frame connected with said upstanding frame and projecting in cantilever fashion over a portion of the tractor to shield the operator of the tractor;
   a plurality of elongated, generally horizontally extending spaced tines having one end thereof connected with the lower end of said upstanding frame; and,
   a blade member rigidly secured to said tines and extending thereacross generally perpendicularly with respect to the elongation of said tines, said blade member having a sharpened cutting edge oriented in a direction relatively away from said upstanding frame and being positioned closer to said upstanding frame than to the free ends of said tines.

3. The brush clearing attachment of claim 2 and also including a post pulling device which includes a bifurcated member, said bifurcated member having legs divergent in a direction relatively away from said upstanding frame and removably attached to a pair of adjacent tines whereby the apex formed by said bifurcation will be positioned thereon at approximately the location of the cutting edge of said blade member.

4. A brush clearing attachment for use with a tractor having a rear mounted power lift including an upper and two spaced, lower lift member, said attachment comprising:
   an upstanding frame including:
      a pair of parallel, spaced vertically extending central members,
      a pair of end members disposed in parallel, spaced relation to said central members, and
      a horizontal member joining the lower ends of said central and end members;
      top members interconnecting the upper ends of said central and end members,
   connection means on said frame for connecting said attachment to the power lift on the tractor, said connection means including
      a vertically extending bracket mounted on each of said central members adapted to be connected with the upper member of the power lift, and
      a horizontal connecting member mounted on said frame relatively below said vertically extending brackets and having each end thereof arranged for connection with one of the lower members of the power lift;

a plurality of horizontal elongated, spaced tines having one end thereof connected with the horizontal member of said tines extending substantially horizontally forward from said upstanding frames in the direction of travel, and said upstanding frame, said tines having a substantially rectangular cross-section and having the lower side of the free ends thereof provided with a radius;

a plurality of spacer members disposed between and connected with adjacent tines whereby said tines are retained in substantially parallel spaced relationship;

a blade member rigidly fixed to the lower side of said tines and extending thereacross perpendicularly with respect to the elongation of said tines, said blade member being located beneath the rear half of said tines and having a sharpened cutting edge oriented in a direction relatively away from said upstanding frame; and, a protective frame extending over a portion of the tractor to shield the operator of the tractor, said protective frame including a plurality of spaced, elongated members each having one end connected with said top members, said spaced, elongated members extending in a direction relatively away from said tines and at an angle with respect to both the horizontal and vertical, and means connecting the free ends of said spaced, elongated members whereby said spaced, elongated members are retained in a generally parallel, spaced relationship.

5. The brush clearing attachment of claim 4 and also including a bifurcated member, said bifurcated member being divergent in a direction relatively away from said upstanding frame and removably attached to a pair of adjacent tines whereby the apex formed by said bifurcation will be positioned thereon at approximately the location of the cutting edge of said blade member.

6. Brush clearing apparatus comprising:

a tractor having
    a rear mounted power lift and an operator's seat located thereon in front of said power lift;

an upstanding frame at least as wide as said tractor;

connection means on said upstanding frame connected with said power lift;

a protective frame connected with and having substantially the same width as said upstanding frame and projecting from said upstanding frame over a portion of said tractor including said operator's seat;

a plurality of generally horizontally extending elongated tines having one end thereof secured to said upstanding frame, said tines extending from the opposite side of said upstanding frame from said protective frame, and said tines having free ends spaced horizontally from said opposite side of the upstanding frame; and a sharpened blade member rigidly secured to and extending across said tines therebeneath and closer to the ends of said tines secured to said upstanding framework than to the free ends of said tines.

References Cited by the Examiner

UNITED STATES PATENTS

| | | | |
|---|---|---|---|
| 1,894,516 | 1/1933 | Karstedt | 37—2 |
| 2,147,884 | 2/1939 | Cope | 56—27 |
| 2,615,262 | 10/1952 | Reid | 37—2 |
| 2,808,665 | 10/1957 | Wedgeworth | 37—2 |
| 2,832,382 | 4/1958 | Lahar | 37—2 |
| 3,004,570 | 10/1961 | Clayton et al. | 143—133 |

FOREIGN PATENTS 748,496    4/1956    Great Britain.

ABRAHAM G. STONE, *Primary Examiner.*

BENJAMIN HERSH, *Examiner.*